United States Patent [19]

Perzl et al.

[11] Patent Number: 4,947,762
[45] Date of Patent: Aug. 14, 1990

[54] MODULAR INTERIOR FOR RAILROAD PASSENGER CARS

[75] Inventors: Leopold Perzl, Gallen; August Zortea, Rorschach; Kurt Anderegg, Rheineck, all of Switzerland

[73] Assignee: Inventio AG, Switzerland

[21] Appl. No.: 255,821

[22] Filed: Oct. 11, 1988

[30] Foreign Application Priority Data

Oct. 12, 1987 [CH] Switzerland ............. 03989/87

[51] Int. Cl.⁵ .............. B61D 45/00; A47H 1/00; B60Q 1/00; B60R 11/00
[52] U.S. Cl. ................... 105/329.1; 105/340; 160/23.1; 224/29.5; 362/73
[58] Field of Search ........ 105/329.1, 340, 397, 105/334, 335, 325; 244/118.2, 118.5, 118.6, 129.4; 52/239; 296/37.7, 37.8; 362/62, 73, 74, 223; 224/29.5, 42.43; 160/23.1, 26; 292/57, 58, 209

[56] References Cited

U.S. PATENT DOCUMENTS

| | | | |
|---|---|---|---|
| 1,711,159 | 4/1929 | Spencer | 292/57 |
| 2,251,050 | 7/1941 | Hagerty | 105/325 |
| 2,284,356 | 5/1942 | Arenberg | 224/29.5 |
| 2,811,932 | 11/1957 | Clary | 105/340 |
| 4,149,221 | 4/1979 | Eggert, Jr. | 362/73 |
| 4,157,584 | 6/1979 | Bhatt | 362/74 |
| 4,458,864 | 7/1984 | Colombo et al. | 244/118.5 |
| 4,647,093 | 3/1987 | Palsson | 292/209 X |
| 4,796,930 | 1/1989 | Baynes | 292/58 |
| 4,817,538 | 4/1989 | Michaelson | 52/239 Y |

FOREIGN PATENT DOCUMENTS 2031546 6/1970 Fed. Rep. of Germany .
3244041 11/1982 Fed. Rep. of Germany .
3406609 2/1984 Fed. Rep. of Germany .
2446752 1/1980 France .
798228 7/1958 United Kingdom .

OTHER PUBLICATIONS

Aviation Week & Space Technology, E. H. Phillips, "McArtor Cites Quality Control in Call for Inspection Program", p. 41, Oct. 1987, U.S.A.

Primary Examiner—Robert J. Oberleitner
Attorney, Agent, or Firm—Marshall & Melhorn

[57] ABSTRACT

An assembly unit for the interior finishing of passenger carrying vehicles, in particular of two story railroad car type, consists of modular prefabricated functional units each having at least one of the functions cable duct, loudspeaker, illumination, baggage repository, window shade, and interior covering. Support beams of the functional units are suitably designed aluminum extrusions. The prefabrication of the functional modules takes place outside of the car body in a workshop region specially equipped for this purpose and comprises the working procedures, mechanical processing, surface treatment, assembly of the functional devices, prewiring and functional testing. The functional modules are installed and assembled in a predetermined sequence in the car body into an assembly unit containing the named functions. The attachment of the functional modules is in part by means of bolted connections on the C-shaped rails mounted in the car body and in part by means of tongue-and-groove connections formed on the extrusions. Depending on the function and the configuration of the car body, the functional units can have different lengths and abutting unit are attached by dowel pins for step-free transitions.

5 Claims, 3 Drawing Sheets

MODULAR INTERIOR FOR RAILROAD PASSENGER CARS

BACKGROUND OF THE INVENTION

The present invention relates to the interior equipment of vehicles and, in particular, to railroad passenger car interiors in one or two level configurations.

It is known to utilize extrusions for the economical construction of interiors for railroad passenger cars, which extrusions are so designed that they perform not only a carrying or supporting function, but are also able to accept constructional parts for the internal equipment. It is generally customary to design these extrusions with channels, C-rails and chambers for the acceptance of the constructional parts. The published West German Patent application No. DE 34 06 609 A1 shows a longitudinal roof girder that is designed in such a way that it forms the outside contour and surface, and it includes hollow spaces for stiffening effect. ducts for lengths of cables and compressed air pipes. C-rails, guides, shoulders and chambers for the acceptance of mechanical and electrical constructional elements as well as starting points for the interior panelling and for coverings.

The drawback of this construction is that the assembly of the constructional parts in the girder is made difficult by the close-fitting space conditions and the only conditionally good accessibility. Furthermore, the expenditure for the interior equipment is still relatively high and spring catch covers and large, easily visible joints are not very vandal resistant and are not esthetically satisfying.

The present invention is based on the problem of finding a better design for the interior of railroad passenger cars and to thereby reduce the cost of such interiors.

SUMMARY OF THE INVENTION

The advantages achieved by the present invention are essentially that a constructive separation of the car body and the equipment of the car interior is achieved. Extrusions are utilized to centrally combine technical functions. Several appropriately designed modular extrusions are the carriers of functional units, and make possible the bolting-on of different constructional parts on an individual basis. The extrusions are joined and locked together in the car body by tongue-and-groove joints and dowel pins. The extrusions form, with a part of their outside surface, the visible cladding or covering surface for at least a portion of the interior side wall of the car. They can be bolted to the C-rails which are tightly joined to the car body. Truly aligned and continuous mutual joining in a longitudinal direction is assured by appropriately placed dowel pins and bore holes in the abutting ends of the extrusions.

The prefabrication of the functional units outside of the car body, in a workshop area equipped with appropriate manufacturing means, provides an advantage over the prior art construction. The fabrication includes the mechanical processing of the extrusions in the form of cutting into sections, drilling of holes and cutting out of recesses. Furthermore, the assembly of the components, the local pre-wiring, the functional testing, and the surface treatment (protective and color coating) is likewise performed outside the car.

A further advantage lies in the fact that the servicing of the functional units during operation is greatly facilitated by good accessibility and easy exchangeability, based on appropriate constructional characteristics. By the combination of the functions of illumination, loudspeaker, window shade, baggage repository, cable channel and partial covering in a single assembly unit consisting of several pre-fabricated functional modules, there results further savings due to the simplified cabling and roof cladding.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
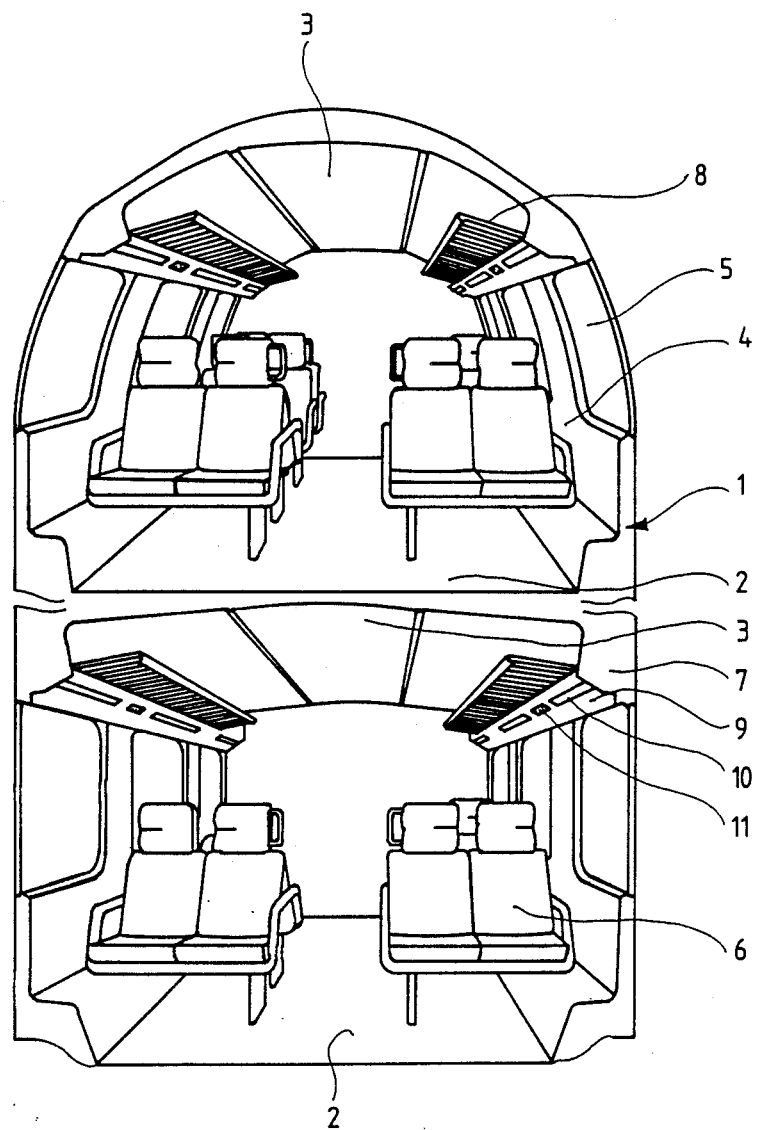
FIG. 1 is a cross-sectional view through a railroad passenger car of two story construction including the present invention.

Designated with 1 in FIG. 1 is a two story or level railroad passenger car body which includes, on each level, a floor 2, a ceiling 3, walls 4 with windows 5, and passenger seats 6. Above the windows 5, assembly units 7 are positioned which extend in the longitudinal direction of the car. Designated with 8 are baggage repositories which extend outwardly from the units 7 toward the center of the car body. Cladding or covering surfaces 9 of the units 7 have formed therein openings 10 for the exit of light and openings 11 for loudspeakers.

Figure 2:
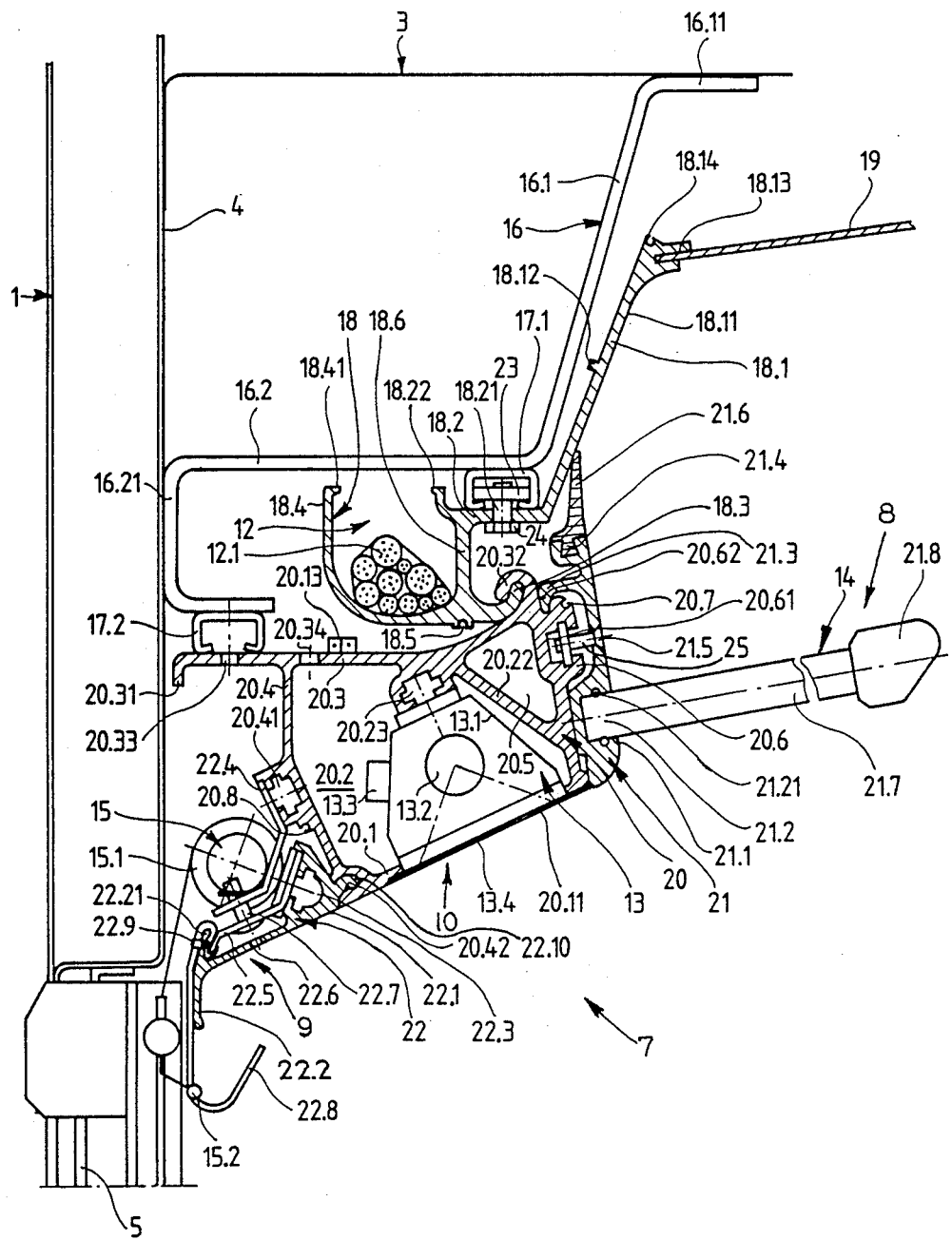
FIG. 2 is a cross-sectional view through a joined and built-in assembly unit according to the present invention.

According to FIG. 2, the assembly unit 7 consists of a plurality of modular functional units such as a cable duct 12, an illumination unit 13, a baggage repository unit 14 and a window shade unit 15, each supporting at least one functional device. These units are attached to an angularly beveled holding extrusion 16 which includes one leg 16.1 which has an outward bend 16.11 at an edge and another leg 16.2 which has a U-shaped bend 16.21 at its edge. The holding extrusion is attached detachably, by way of the bend 16.11, with the ceiling 3 and, by way of the web of the bend 16.21, to the wall 4 of the car body 1. A first C-shaped rail 17.1 is attached to the end of the leg 16.2 adjacent the leg 16.1 and a second C-shaped rail 17.2 is attached to the horizontal end of the bend 16.21 of the holding extrusion 16, both rails having an opening pointing toward the floor of the car.

The cable duct unit 12 consists of a U-shaped extrusion 18 with an inclined upward pointing leg 18.1 having a cladding or covering surface 18.11 visible in the passenger space, a rear horizontally extending reinforcing rib 18.12 and, at an upper end, a groove 18.13 open toward the car center for the insertion of an edge of a ceiling covering plate 19. An intermediate web 18.2 is bent horizontally to the wall 4 above a vertically extending center web 18.6 and has a fastener hole 18.21 formed therein. The intermediate web 18.2 is terminated on its outer edge with an upward directed flange 18.22 with an enlarged bead at its edge. A foot portion of the extrusion 18 is designed as a spherically upwardly curved leg 18.3 extending toward the center of the car. The cable duct area is generally U-shaped and is formed by the central web 18.6 and an upwardly curved leg 18.4, the upper end of which is an inwardly pointing enlarged bead 18.41. At the upper end of the leg 18.1, the extrusion has a three quarter circle shaped channel or duct 18.14 and, on the lower end of the central web 18.6, a second three quarter shaped channel or duct 18.5, which ducts are shaped for the acceptance of dowel pins.

20 is a modular extrusion of box-type design for the illumination functional unit 13. A large hollow space 20.2 is bounded by an upper horizontal web 20.3, to the right by a roughly 45° inclined downward toward the car center reinforcing rib 20.22, below by a covering surface 20.11 visible in the passenger space, and to the left by a wall 20.4 which is bent slightly outwardly in the middle. In the right upper corner of the hollow space 20.2, a C-shaped rail or channel 20.23 opens downwardly and is formed inclined slightly toward the right. A small triangular hollow space 20.5 to the right of the space 20.2 is bounded by the reinforcing rib 20.22, the inclined upwardly continued end of the web 20.3, and a right outside wall 20.6. The horizontal web 20.3 protrudes to the left over the end of the wall 20.4 and terminates with a short leg 20.31 extending downwardly. The part of the web 20.3 protruding to the left has a fastener hole 20.33 formed therein. Another hole 20.34 extends through the web 20.3 into the hollow space 20.2. At the upper end of its lower half, the wall 20.4 has formed therein a C-shaped rail 20.41 facing the wall 4, the opening of which points downward left at an angle of about 30° with respect to the horizontal. The left lower corner of the extrusion 20 has a spherically curved groove 20.42 open to the left. The outside side-wall 20.6 bounding the triangular hollow space 20.2 has a C-shaped rail 20.61 formed therein which opens toward the center of the car. The extrusion 20 has in the upper right corner a hook shaped end 20.32 forming a downwardly open U-shaped groove which encloses the spherically curved leg 18.3. Between the hook shaped end 20.32 and the upper side of the C-shaped rail 20.61, an upwardly open groove 20.62 is molded. On the outside of the right side wall forming the groove 20.62, a first three quarter circle shaped duct 20.7 is molded. In the left corner of the space 20.2 between the lower side of the C-shaped rail 20.41 and the lower part of the left side wall 20.4, a second three quarter circle shaped duct 20.8 is molded. The ducts 20.7 and 20.8 accept dowel pins.

A longitudinally extending extrusion 21 has a visible smooth covering surface 21.1 facing the interior of the car. A lower portion of the surface 21.1 is rounded to blend into the surface 20.11 of the extrusion 20. On the lower, thicker part of the extrusion 21, a rectangular channel or duct 21.2 is molded which is open at the visible surface 21.1. A groove 21.21 formed in each in the side walls of the channel 21.2 retains attaching hardware, not described here in more detail, of a support beam 21.7. The support beam 21.7 has one longitudinal edge retained by the channel 21.2 and an opposite longitudinal edge carrying a triangular rim cap 21.8, which is rounded at the corners. The central, thin portion of the extrusion 21 has a fastener hole 21.5 formed therein. Along an upper edge, a dove-tailed channel or duct 21.4 is formed for the acceptance of a trim strip 21.6 which extends upwardly into contact with the surface 18.11. On the upper part of the rear side of the extrusion 21, there is formed a horizontally protruding leg or tongue 21.3 turned down at the end, which engages in the groove 20.62 of the extrusion 20.

An extrusion 22 has a visible surface 22.1 facing the car interior with a fastener hole 22.6 formed therein and a thickened leg 22.2 at the left edge bent toward the car floor. The leg 22.2 also extends above the surface 22.1 as a leg 22.21. Another fastener hole 22.9 is formed in the leg 22.21. The edge of the extrusion 22 lying opposite to the leg 22.2 is formed as a spherically bent leg 22.10. A C-shaped channel or duct 22.3 is located on the rear side of the extrusion 22 opposite the leg 22.10 and is opened at an angle of about 45° with respect to the rear side of the extrusion.

Figure 3:
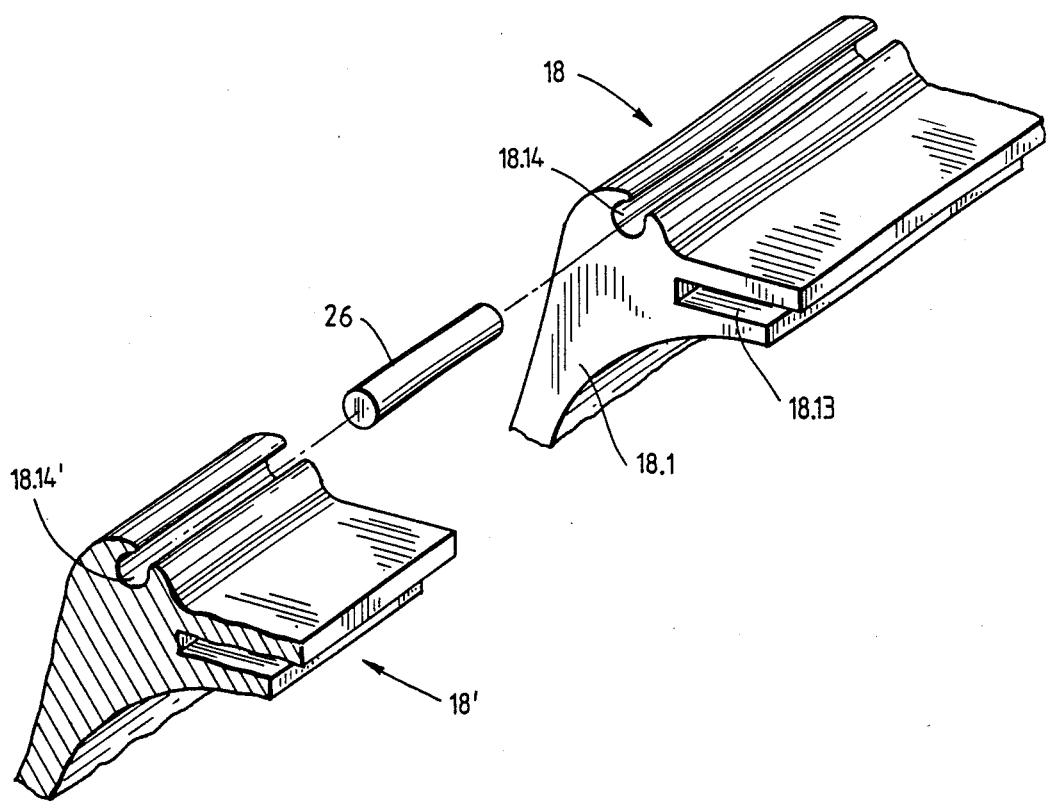
FIG. 3 is a fragmentary perspective view of two abutting modular extrusions of the type shown in FIG. 2 according to the present invention.

The individual functional units are manufactured, assembled, and installed as described below. The modular extrusion 18 for the cable duct unit 12 is cut into sections, for example to the length of a car compartment, a plurality of the fastener holes 18.21 are drilled and the visible surface 18.11 is finished. The pre-assembly proper consists in the installation of a cable bundle 12.1 in the cable duct formed by the leg 18.4 and the web 18.6. The installation in the inside of the car takes place by means of a fastener such as a bolt 24 extending through the hole 18.21 and engaging a nut 23 held in the C shaped rail 17.1 repeated for each of the fastener holes 18.21. The cable duct unit 12 can be joined to further cable ducts by inserting dowel pins on one end into the three quarter circle shaped ducts 18.14 and 18.5 in order to assure a step free transition with an abutting end of an adjacent extrusion 18. For example, as shown in FIG. 3, one end of a dowel pin 26 can be inserted into the duct 18.14 and an opposite end of the pin 26 can be inserted into a duct 18.14' formed in a second similar adjacent modular extrusion 18'. The insertion of the ceiling covering plate 19 into the groove 18.13 can take place together with the cable assembly or later. The modular cable duct unit 12 includes the functions of cable duct and covering.

The extrusion 20 of the illumination unit 13 is cut to length and provided with the fastener holes 20.33 and 20.34. A supporting piece of sheet metal 22.4 is bolted on in specified positions along the rail 20.41 and then openings are machined out for attaching a roller shade mounting as will be described below. A surface treatment on the covering surface 20.11 terminates this phase of processing. The illumination means, consisting of a reflector housing 13.1 and a series connected electrical fixture 13.3 and a fluorescent tube 13.2, is installed in the hollow space 20.2 on the rail 20.23. A loudspeaker 11, not visible in FIG. 2, is installed in the same manner. The attachment of a transparent covering 13.4 for the light exit openings and a perforated cover for the loudspeaker opening terminates the mechanical assembly work. The electrical connecting lines (not shown) from the illumination means and the loudspeaker 11 are routed through the hole 20.34 to a terminal strip 20.13 mounted on top of the web 20.3 and connected there. The modular unit 13 includes the functions of illumination, loudspeaker, and covering.

After performing a functional test, the functional unit 13 is ready to be installed in the car. The functional unit 13 is attached to the spherically curved leg 18.3 of the extrusion 18 with the hook shaped end 20.32 of the extrusion 20 and the electrical connection is made between the terminal strip 20.13 and the cable 12.1. After that, the functional unit 13 is pivoted toward the wall 4 until it abuts the rail 17.2 and is pushed in a longitudinal direction until fitted dowel pins in the three quarter circle shaped ducts 20.7 and 20.8 engage the corresponding ducts in a previously installed unit 13 to result in a step-free transition from one functional unit to the next. The fastener hole 20.33 then receives a bolt to engage a nut in the rail 17.2 whereby the unit 13 is supported by the cable duct unit 12 and the holding extrusion 16.

After cutting to length, drilling and surface treatment of the extrusion 21 for the baggage repository 14, the trim strip 21.6 is pulled into the channel 21.4, the support beams 21.7 are pressed into the channel 21.2, the spaces in the channel 21.2 between the beams covered, and the rim cap 21.8 pressed onto the protruding ends of the beams. The installation in the car takes place by attaching the leg 21.3 into the groove 20.62, abutting the trim strip 21.6 to the leg 18.1 of the extrusion 18, abutting the lower parts on the extrusions 20 and 21, and bolting together the extrusions 20 and 21 using a fastener 25 and the rail 20.61. The modular unit 14 includes the functions of baggage repository and covering.

The cutting to length of the extrusion 22 for the window shade module 15 to the width of the window 5 and the drilling of the fastener holes 22.6 and 22.9 are the manufacturing operations for the unit 15. After having carried out the surface treatment, a roller shade mounting, consisting of a roller shade drum 15.1, a carrier support 22.5 with a snap closure 22.7 and a roller shade access bar 15.2, is bolted to the rail 22.3 of the extrusion 22. A support hook 22.8 is attached to the leg 22.21 and bolted or riveted together with the same at the hole 22.9. At the assembly of the roller shade, a piece of roller shade material is first unrolled from the drum, the roller shade access bar with some roller shade material is threaded into the groove at the window 5, the extrusion 22 with the spherically curved leg or tongue 22.10 is pushed in the identically curved groove 20.42 of the extrusion 20, the entire functional unit is pivoted upward to the mechanical stop and is fastened in its end position by means of the rotary snap closure 22.7 which engages the opening formed in the sheet metal 22.4. The modular unit 15 includes the functions of window shade and covering.

Clearly, the assembly unit 7 is formed of modular functional units which include extrusions that are joined by tongue-and-groove joints and fasteners. For example, the tongue 18.3 engages the groove formed by the end 20.32, the tongue 21.3 engages the groove 20.62, tongue 22.10 engages the groove 20.42, the fastener 25 engages the rail 20.61, a fastener engages the rail 20.41, and a fastener engages the duct 22.3 to provide means for attaching the modules together. In addition, the fastener 23 and 24 engages the rail 17.1 and a fastener engages the rail 17.2 to provide means for attaching the modules to the car body 1 at existing predetermined locations.

According to FIG. 2, the modular extrusions 18, 20. 21 and 22 exhibit those shapes which are required for the lower floor or level of the car. In the upper level assemblies, the extrusions 18, 20. 21 and 22 exhibit the same functions and characteristics, but can have, based on the changed car body contour, correspondingly matching cross sectional shapes.

A wall 20.1 including the visible surface 20.11 defining the openings 10 and 11 and bounding the hollow space 20 can be omitted, and the visible surface with the built-in constructional parts (illumination, loudspeakers) can be formed as a single opening. For the purpose of strengthening, reinforcing ribs can be provided additionally.

The holding module 16 can also be attached with an undetachable or conditionally detachable joint (gluing, welding, riveting) to the car body 1. The cable duct 12 can be subdivided and can have a removable covering.

The modular extrusions 18, 20, 21 and 22 can consist of any material such as aluminum. It is possible to reduce or increase the number of the functional units. This could mean an extrusion with an air conditioning or ventilating installation. With appropriate design also other tasks can be assigned to the functional units, such as for example optical signals, hydraulic and air installations, mechanical devices and additional strengthening of the car body. The principle of the invention is also applicable for road, water, air and space vehicles.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A modular interior for a passenger carrying car comprising:
   a modular cable duct unit having a covering surface and adapted to support a cable bundle and including means for attaching to a car body;
   a modular illumination unit having a covering surface, and means for illuminating and including means for attaching to the car body and to said modular cable duct unit;
   a modular baggage repository unit having a covering surface and means for retaining baggage and including means for attaching to said modular illumination unit; and
   a modular window shade unit having a covering surface and roller type window shade and including means for attaching to said modular illumination unit whereby said modular units form an assembly unit joined to the car body with said covering surfaces visible to the interior of the car.

2. The modular interior according to claim 1 wherein said means for attaching includes tongue-and-groove joints between said modular cable duct unit and said modular illumination unit, between said modular baggage repository unit and said modular illumination unit and between said modular window shade unit and said modular illumination unit.

3. The modular interior according to claim 1 wherein said means for attaching includes a rotary snap closure for attaching said modular window shade unit to said modular illumination unit.

4. The modular interior according to claim 1 wherein said means for attaching includes a fastener engaging a rail connected to the car body for attaching said modular cable duct unit to the car body and for attaching said modular illumination unit to the car body.

5. The modular interior according to claim 1 wherein said modular cable duct unit and said modular illumination unit each include at least one duct adapted for receiving and retaining a dowel pin for engaging a duct on an abutting one of said modular units.

* * * * *